Aug. 19, 1924.
G. A. MOCK
1,505,598
WHEEL
Original Filed Nov. 1, 1920
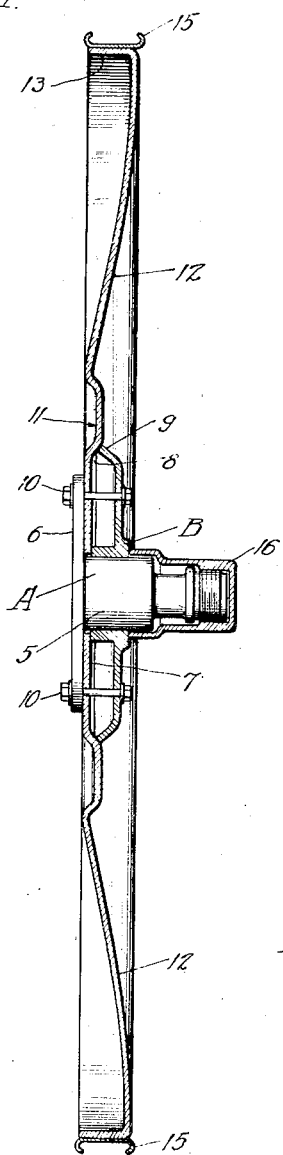
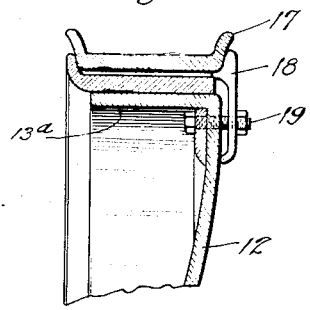
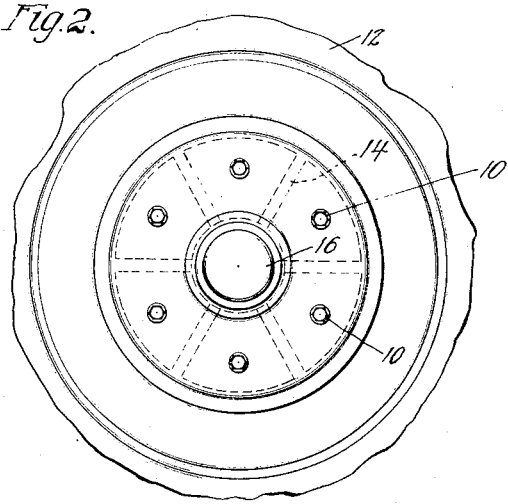
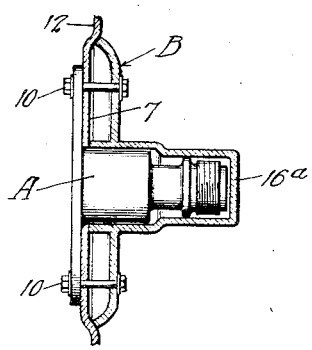
Inventor
George A. Mock.
By Gabel & Mueller
attys.

Patented Aug. 19, 1924.

1,505,598

UNITED STATES PATENT OFFICE.

GEORGE A. MOCK, OF CHICAGO, ILLINOIS, ASSIGNOR TO MOTOR WHEEL CORPORATION, OF LANSING, MICHIGAN, A CORPORATION OF MICHIGAN.

WHEEL.

Application filed November 1, 1920, Serial No. 421,031. Renewed May 18, 1922. Serial No. 562,039.

*To all whom it may concern:*

Be it known that I, GEORGE A. MOCK, a citizen of the United States, residing at Chicago, in the county of Cook and State of Illinois, have invented a certain new and useful Improvement in Wheels, of which the following is a full, clear, concise, and exact description, reference being had to the accompanying drawings, forming a part of this specification.

My invention relates to wheels and has to do more particularly with disk wheels for automobiles and the like, being directed more to the provision of a disk wheel having certain features of improvement whereby a strong but resilient wheel is the result.

One of the features is the provision of a wheel disk which may be readily secured to the standard type of wooden spoke hub having a flanged back and central tubular portion, the disk being centrally cupped so as to receive a cap therein whereby the parts may be readily secured together and a distribution had of the driving strain.

Another feature is the provision of a peculiarly shaped disk whereby although comparatively thin sheet metal is used, the wheel is resilient though strong enough to take the ordinary shock without injury.

Other features will be more particularly referred to in the ensuing specification and claims.

For a better understanding of my invention, reference is to be had to the accompanying drawing, in which—

Fig. 1 is a transverse cross section through the wheel;

Fig. 2 is a face view of the cap for clamping the disk to the hub;

Fig. 3 is a modified form showing a demountable rim, Fig. 1 showing the clincher type; and Fig. 4 is a modified form of disk clamping cap in which the hub cap is integral with the disk clamping cap.

Referring now more in detail to the form of my invention shown in Figs. 1 and 2, I have shown the ordinary Ford type of hub A such as is used for wooden spoke wheels having a tubular portion 5 and outwardly extending flange portion 6.

Secured to the hub A is a wheel disk having a central flat portion 7 adapted to rest against the flange 6 of the hub and having a central opening large enough to readily slip over the tubular portion 5 of the hub. The wheel disk is also cupped in the middle by forming an outwardly extending portion 8. By cupping the disk in this way, the clamping cap B will set into the cupped portion so as to engage the edge thereof at the peripheral edge 9 of the cap. The cap B preferably fits snugly over the tubular portion 5 and a suitable number of bolts 10 passed through the parts to securely hold them together. By this construction, the disk is held firmly against the flange of the hub and the driving strain distributed and not all placed upon the frictional contact between the flange 6 and central flat portion of the disk. That is, the clamping cap B takes the greater part of the strain by fitting snugly over the hub 5 and into the disk cup. This cap B is preferably made of cast aluminum so that it may be polished and partake of an attractive finish. A plurality of ribs 14 are provided so as to strengthen it.

Now in order to give resiliency to the wheel from road shock, I provide an annular recess or cup 11 and then a slightly curved disk portion 12 between the annular recess 11 and the felly 13. By providing the annular recess 11 and slightly curving the disk portion 12, the wheel is a great deal stronger than if these portions were straight and at the same time provides a structure having some resiliency. By curving the portion 12 of the disk, the wheel is strengthened greatly against side shock, also providing a resiliency which causes the disk to spring back to normal following any undue side strain.

In Fig. 1, I have shown the ordinary type of clincher rim 15 which is preferably welded to the felly 13 of the wheel disk which is preferably made of cold rolled steel.

In order to enclose the end of the hub, I provide a hub cap 16 which is of a suitable shape to enclose the exposed end of the hub and abut against the cap B.

It will be apparent that although I have referred to the wheel as being applied to the ordinary Ford hub, it may be used in connection with the other standard types of hub, being used to great advantage for replacing wooden spoked wheels, by simply removing the old wooden spokes and felly and replacing them with my improved disk wheel.

Also, the parts are secured together in a simple way so that they may be readily assembled and taken apart for replacement with spare disks where the rim is of the clincher type and is permanently secured to the felly of the disk.

I also contemplate using my improved disk in connection with demountable rims and have shown the well known Baker type in Fig. 3. The rim 17 is of the well known split type and held in place over the felly 13ª by means of the usual clamp 18 and the bolt and nut 19. When using the demountable rim, the rim itself may be changed without carrying an entire spare disk wheel, where desired.

In Fig. 4 I have shown the cap B as having a hub cap 16ª formed integral therewith, being preferably cast as a portion of the cap B and all polished so as to partake of an attractive finish.

Although I have shown my invention in several preferred forms, I contemplate applying it in other ways and appreciate that changes and modifications will readily occur to those skilled in the art and therefore do not desire to be limited to the exact structures shown and described but aim to cover all that which comes within the spirit and scope of the appended claims.

I claim—

1. A disk wheel comprising a flanged hub, a single centrally cupped disk removably fitted over the hub and having the outside seat of the cup resting against the hub flange, a cap also fitted over the hub and having a peripheral edge resting against the disk cup, and means for securing the hub, disk and cap together.

2. A disk wheel comprising a flanged hub, a single centrally cupped disk removably fitted over the hub and having the outside seat of the cup resting against the hub flange, a cap also fitted over the hub and having a peripheral edge resting against the disk cup, and bolts extending through the hub, disk and cap to temporarily secure them so as to be readily assembled and taken apart.

3. In a disk wheel, a disk having a central straight hub-flange securing portion, a narrow annular shallow cupped portion between the central straight portion and the peripheral edge, and a dished slightly curved wide annular portion between the cupped portion and the peripheral edge.

4. A disk wheel comprising a standard type of hub having a tubular central portion and rear flange, a flat bottomed centrally abruptly cupped disk fitting over the tubular portion and resting against the flange, a cap closely fitting over the outer end of the tubular portion of the hub and resting in the disk cup against the side so as to effect a radial thrust to support the disk, and means for clamping the parts together.

5. A disk for disk wheels comprising a central hub-flange securing cup portion, a narrow annular free or exposed shock-absorbing cup portion around the central cup portion, and a wide dished disk portion extending from the annular cup substantially to the peripheral edge.

6. A wheel disk for single disk wheels for use on standard wooden wheel hubs having a central tubular portion and rear straight flange, said disk comprising a central flat portion adapted to fit over the tubular portion of the hub and seat against the inner face of the hub flange, said flat portion extending forwardly so as to form a cup with an abrupt wall for receiving the radial thrust from the peripheral edge of a clamping cap, a narrow annular free or exposed shock-absorbing cup portion, and a wide dished disk portion extending from the annular cup substantially to the peripheral edge.

7. In a disk wheel the combination of a standard type of hub for wooden spokes having a tubular central portion and rear straight flange with radially disposed bolt holes, a disk having a central portion with an abrupt annular wall and fitting over the tubular portion of the hub and seating on the inner face of the flange, a dished disk portion connecting the central portion and a rim securing periphery, a clamping cap closely fitting over the tubular portion of the hub and seating against said abrupt annular wall so as to effect a radial thrust thereon to support the disk, said cap having bolt holes corresponding to the flange holes, and bolts passing through the flange, disk and cap to clamp said parts together In witness whereof, I hereunto subscribe my name this 22nd day of October, A. D., 1920.

GEORGE A. MOCK.